UNITED STATES PATENT OFFICE.

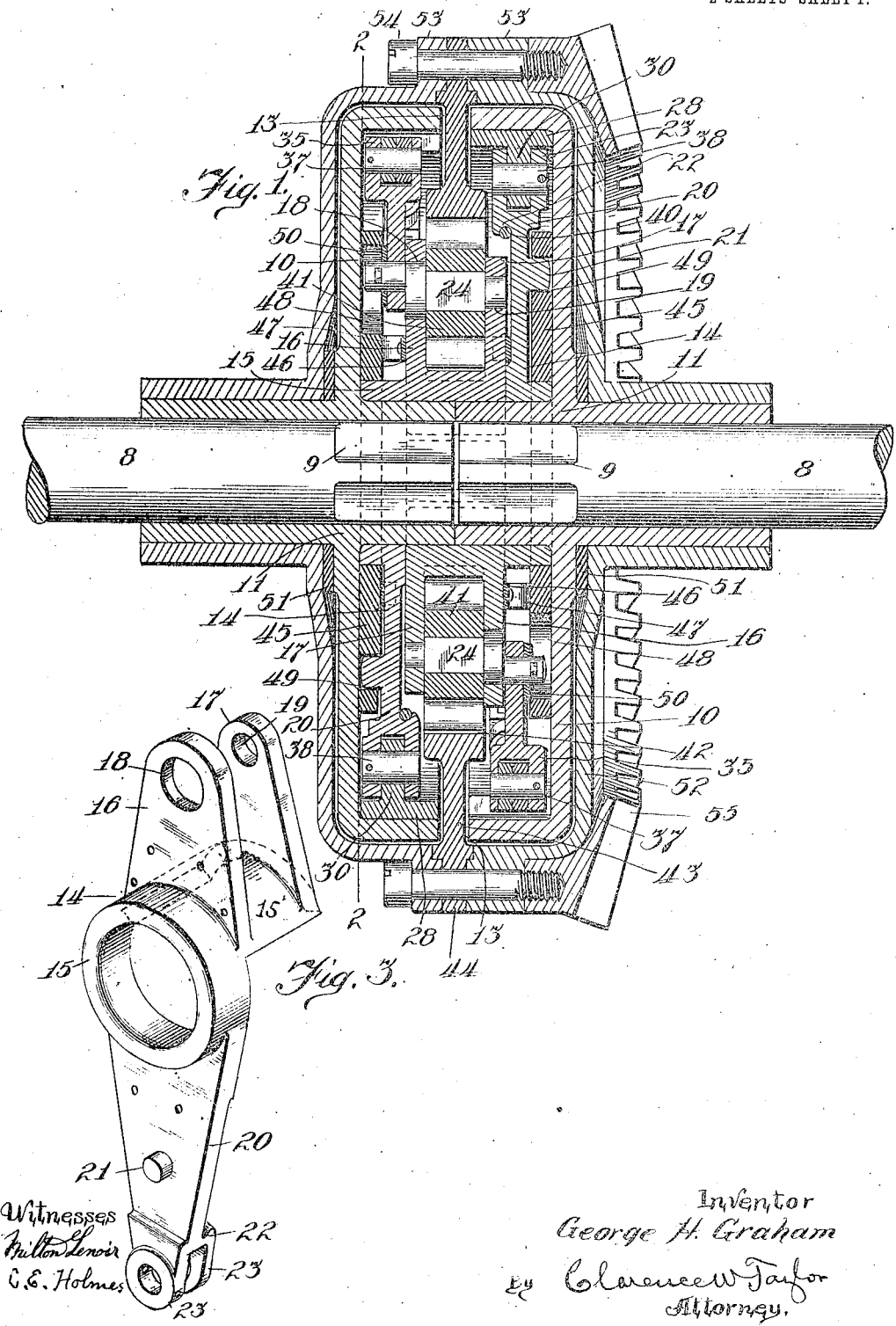

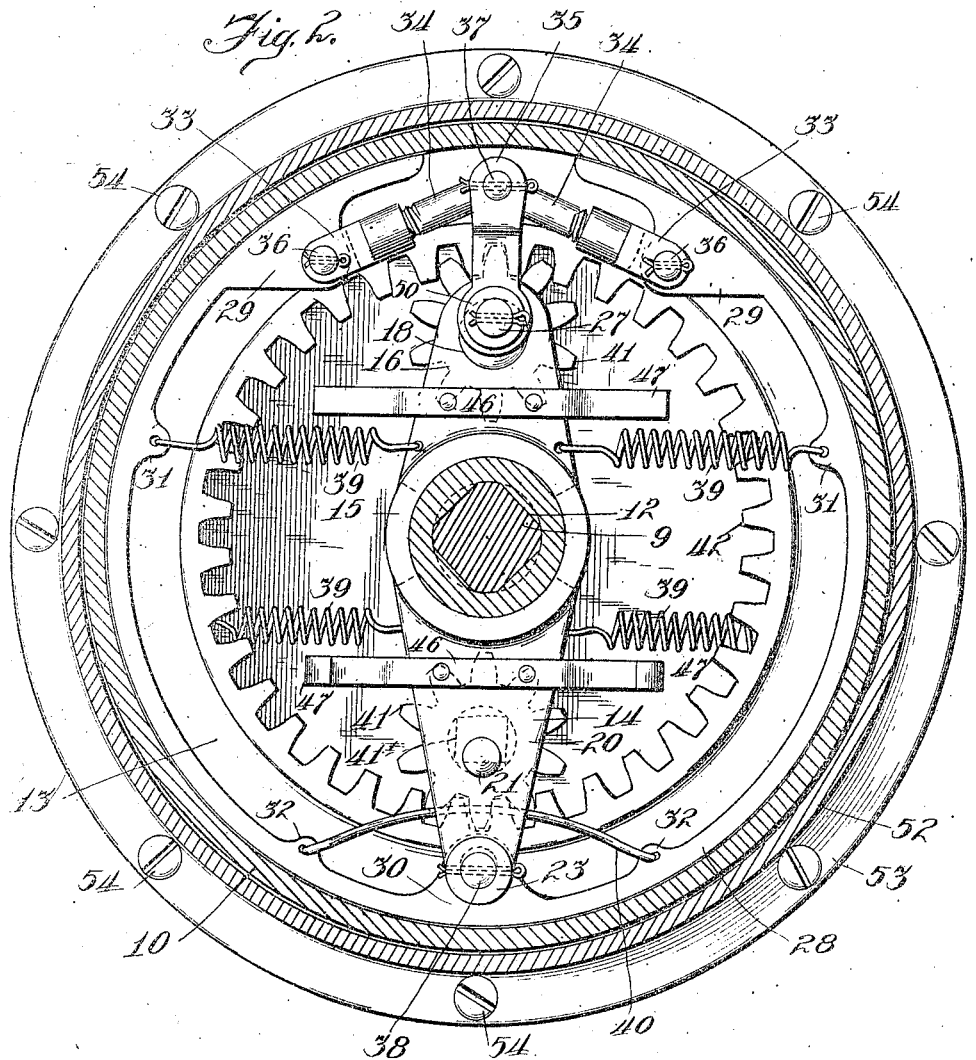
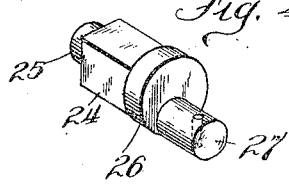

GEORGE H. GRAHAM, OF CHICAGO, ILLINOIS, ASSIGNOR OF ONE-HALF TO FRANK MARSHALL LEWIS, OF CHICAGO, ILLINOIS.

DIFFERENTIAL MECHANISM.

981,258.   Specification of Letters Patent.   Patented Jan. 10, 1911.

Application filed June 4, 1909. Serial No. 500,192.

*To all whom it may concern:*

Be it known that I, GEORGE H. GRAHAM, citizen of the United States, residing at Chicago, in the county of Cook and State of Illinois, have invented certain new and useful Improvements in Differential Mechanism, of which the following is a specification.

My invention relates to improvements in a differential mechanism for vehicles, and the objects of my improvement are; first, the provision of power transmitting means for dividing the power between the traction wheels of a vehicle to the end that neither wheel can revolve at a slower rate than the driving mechanism, but either wheel may automatically release from the source of power and revolve at a more rapid rate than the driving mechanism in the direction of the movement of the vehicle particularly when entering a curve; second, to provide a construction whereby the braking effort of an engine or other source of power may be utilized to produce a retarding effect equally upon both traction wheels; third, to increase the efficiency of an automobile or other vehicle on wet or slippery road surfaces by affording a two-wheel drive; fourth, the provision of means for automatically releasing the outside traction wheel from the source of power when describing a curve; and, fifth, to obviate "stalling" of a vehicle when one drive wheel gets into a mud hole or a slippery place.

With these and other objects in view, my invention consists in the novel features and in the combination and arrangement of parts all hereinafter more specifically described, illustrated in the accompanying drawings forming a part of this specification, and particularly pointed out in the claims.

Figure 1, is a section through the assembled mechanism. Fig. 2, is a view on line 2—2 of Fig. 1 with the drag-plate omitted. Fig. 3, is a perspective view of the clutch-carrier. Fig. 4, is a perspective view of a pinion crank-shaft.

Similar numerals refer to similar parts throughout the several views.

One embodiment of my invention is described as follows: The two halves of the differential or driving case and the internal gear wheel and the bevel driving gear wheel are assembled into an operative unit. The two inwardly extending drum shells or clutch-drums are concentrically and rotatably mounted within the assembled unit, each of the drums being fixed to one end of a divided axle, (or jack shaft), to the outer ends of which are fixed the traction wheels, or sprockets in the case of vehicles using a jack shaft and double chain drive. Two separate operable mechanisms are inclosed within said assembled unit, one for each driving wheel, and each consisting of a pinion meshing with said internal gear, a carrier rotatably supporting the pinion and also carrying a clutch shoe, a toggle mechanism connecting the ends of the clutch-shoe to the eccentric or crank shaft of the pinion so as to expand the clutch shoe when the pinion is caused to rotate either way from normal or released position. The two independent clutch means which are connected in a manner to engage and release the respective driving wheels of a vehicle, are inclosed within a single driven case, and have operative connection between the case and the clutches to transmit driving torque to both wheels equally when the wheels are moving at the same rate of speed or traveling in a straight line, and to permit the automatic release of one traction wheel from the driving mechanism when road or other conditions cause a relatively greater speed of such wheel, as, for example, when deviating from a straight line of travel in turning a corner.

The independent shafts, 8, 8, or divided axle of a vehicle has rectangular adjacent ends, 9, 9, and each carries a clutch-drum or shell, 10, having a hub, 11, with a rectangular open inner end, 12, to receive the rectangular portion, 9, of the axle. The numeral, 13, designates an annular space or path between the opposing ends of the drums for the travel of the web of an internal gear wheel hereinafter described.

Disposed within each clutch-drum is a clutch and pinion carrier, 14, mounted on the inner end of the hub, 11, and capable of an oscillatory movement thereon. The numeral, 15, denotes the hub of the carrier, on the segmental extension, 15′, of which are the pinion jaws or arms, 16, and 17, with bearings, 18, and 19 respectively. The clutch-shoe supporting arm, 20, of the carrier has a boss, 21, a spring receiving groove, 22, and apertured jaws, 23, the latter for engagement with the shoe, 28. The segmental extensions serve to limit the rotative or oscillatory movement of one carrier with respect to the other. It will be apparent that in the absence of means for this purpose the shoes would be pulled into locked and unlocked position, thus transmitting little, if any power to the axles.

In Fig. 4 is shown the pinion shaft having a rectangular portion, 24, reduced or journal end, 25, portion, 26, and a crank or eccentric pin, 27. The clutch-shoe, 28, has apertured flanges, 29, for toggle connections, apertured flange, 30, for carrier connection, apertured flanges, 31, for clutch-release springs engagement, and apertured flanges, 32, for the clutch-shoe lifting spring engagement. The toggle jaws, 33, are connected to flange, 29, and carry apertured rod, 34, for engagement with toggle link jaws, 35. The jaw pins, 36, link pin, 37, and clutch carrier pins, 38, are of common form. The spiral springs, 39, constantly operate to draw the clutch-shoe from contact with the drum. The pinion, 41, has a rectangular opening, 41′, therethrough to receive the rectangular portion of the shaft (Fig. 4), and meshes with the internal gear wheel, 42. The internal gear wheel has a web portion, 43, and an external annular flange, 44, which is apertured to permit the case screws, 54, to pass therethrough.

For the purpose of additional retardation of the oscillatory movement of the carrier, 14, in heavy or slow moving vehicles there is inserted a circular drag-plate, or friction element, 45, in each drum and contacting with the wall thereof. The drag-plate spring, 46, consisting of a flat spring blade constantly urges the drag-plate against the inner wall of the drum. The plate has a large hole, 48, therethrough to afford a clearance of the crank pin, and a smaller hole, 49, to receive the boss, 21. The crank-pin washer, 50, is held in position by the usual cotter pin.

Thrust washers, 51, preferably red fiber, are disposed on the drum hub between the drum and the differential or driving case, 52, each half of which has an apertured external flange, 53, through which the case screws, 54, pass to screw threaded engagement with the bevel gear wheel, 55, carried by the case and meshing with a bevel pinion (not shown) on the drive shaft of the motor of the vehicle (not shown).

In operation, when motion is imparted to the rotatable case by the action of the motor of the vehicle, the case has a slight rotative movement before the wheels of the vehicle are caused to rotate, the action being the rotation of the internal gear which causes rotation of the pinions upon their respective shafts in the carriers. The carriers remain momentarily at rest due to inertia and in heavy or slow moving vehicles to friction between the drum and the drag-plate which must move with the carrier. As soon as the pinions begin to revolve the two crank pins pull inwardly on the connecting links and radially expand the two clutch-shoes into frictional adherence to the inner surfaces of the respective drums. When frictional grip is complete between each shoe and drum, further action of the toggle being impossible rotation of each pinion is stopped causing a positive lock through its teeth between the rotating gear and the carrier, the clutch-shoe and the drum to the traction wheel of the vehicle. When the vehicle enters a curve the outer wheel having to describe a circle of a greater radius must travel at a speed greater than the inner wheel in the direction of movement of the vehicle. As the inner wheel cannot rotate slower than the driving case mechanism owing to the grip of the clutch, it is necessary that the outer wheel exceed the speed of the driving case to prevent dragging the tire upon the road surface. When the outer wheel begins to rotate faster its inner drum causes the carrier to advance in relation to the internal gear, thus moving the axis of the pinion forward in respect to the internal gear, and reversing the action which resulted in setting the toggle, whereby the clutch-shoe is released and such outer traction wheel is free to revolve at a greater speed than the inner traction wheel.

Variations in the form, proportions, arrangement and details of my invention may be resorted to without departing from the spirit and scope of my invention, and hence I consider myself entitled to all such variations and changes as may lie within my claims.

Having thus fully described my invention, what I claim as new, and desire to secure by Letters-Patent, is—

1. The combination, of an axle, a clutch member fixed thereto, a coacting clutch member, a carrier for the same, an internal gear wheel, a pinion rotatably supported by the carrier and meshing with the internal gear wheel, and means operatively connected to the pinion to engage and release the clutch members.

2. The combination, of an axle, a clutch member fixed thereto, a coacting clutch member, a carrier for the same, an internal gear wheel, a pinion rotatably supported by the carrier and meshing with the internal gear wheel, means to retard the movement of the carrier, and means operatively connected to the pinion to engage and release the clutch members.

3. The combination, of an axle, a clutch member fixed thereto, a coacting clutch member, a carrier for the same, a driving case, an internal gear wheel fixed to the case, a pinion rotatably supported by the carrier and meshing with the internal gear wheel, and means operatively connected to the pinion to engage and release the clutch member.

4. The combination in differential mechanism, of the independent axles, clutch drums fixed to the inner ends of the axles, a clutch shoe within each drum, a carrier in each drum and rotatably supporting a pinion, a single internal gear wheel in mesh with the pinions, and means operatively connected to the pinions to engage and disengage the shoe and drum of one axle independently of the other.

5. The combination in differential mechanism, of independent axles, a clutch member fixed to one end of each axle, a clutch shoe within each member, a carrier for each shoe, a pinion rotatably supported by each carrier, a driving case, an internal gear wheel fixed to the case and in mesh with both pinions, and independent means operatively connecting each shoe and its pinion to expand and release such shoe.

6. The combination in differential mechanism, of independent axles, a drum fixed to one end of each axle, a clutch shoe in each drum, a carrier for each shoe, a pinion rotatably supported by each carrier, means operatively connecting each pinion and shoe, frictional elements to retard the movements of the carriers, a driving case, and an internal gear wheel in mesh with both of the pinions.

7. The combination in differential mechanism, of a driving case, an internal gear wheel carried thereby, two inwardly extending drum shells concentrically and rotatably mounted within the driving case, independent axles, a drum fixed to one end of each axle, a plurality of pinions each meshing with the internal gear wheel and independently rotatable, an oscillatory carrier for each pinion, a clutch shoe connected to each carrier, and expansion and release means operatively connecting each shoe and its pinion to expand the shoe into frictional adherence to a drum shell and subsequently release the same.

8. The combination in differential mechanism, of a driving case, an internal gear wheel carried thereby, two inwardly extending drum shells concentrically and rotatably mounted within the driving case, independent axles, a drum fixed to one end of each axle, a plurality of pinions each meshing with the internal gear wheel and independently rotatable, an oscillatory carrier for each pinion, a clutch-shoe connected to each carrier, a drag-plate to retard the movement of the carrier, and independent means operatively connecting each shoe and its pinion to expand the shoe into frictional adherence to the drum shell and subsequently release the same.

9. The combination in differential mechanism, of a driving case, an internal gear wheel carried by the case, two inwardly extending drum shells concentrically mounted within the driving case, independent axles, a drum fixed to one end of each axle, a plurality of pinions each meshing with the internal gear wheel and mounted for independent rotation, an oscillatory carrier for each pinion, the carriers having hubs with segmental extensions and positioned to interfere with each other to limit the extent of movement of the one in respect to the other, a clutch shoe connected to each carrier, and independent means operatively connecting each shoe and its pinion to expand the shoe into and release it from frictional adherence to the drum shell.

10. In a differential mechanism, the combination of two carriers each with a hub having a segmental extension and positioned to interfere with each other to limit the extent of oscillation of the one with respect to the other.

In testimony whereof I affix my signature in presence of two witnesses.

GEORGE H. GRAHAM.

Witnesses:
S. ELVA KELLOGG,
JAMES R. STEWART.